D. CAMMERER.
Beer Cooler.
No. 63,013. Patented Mar. 19, 1867.
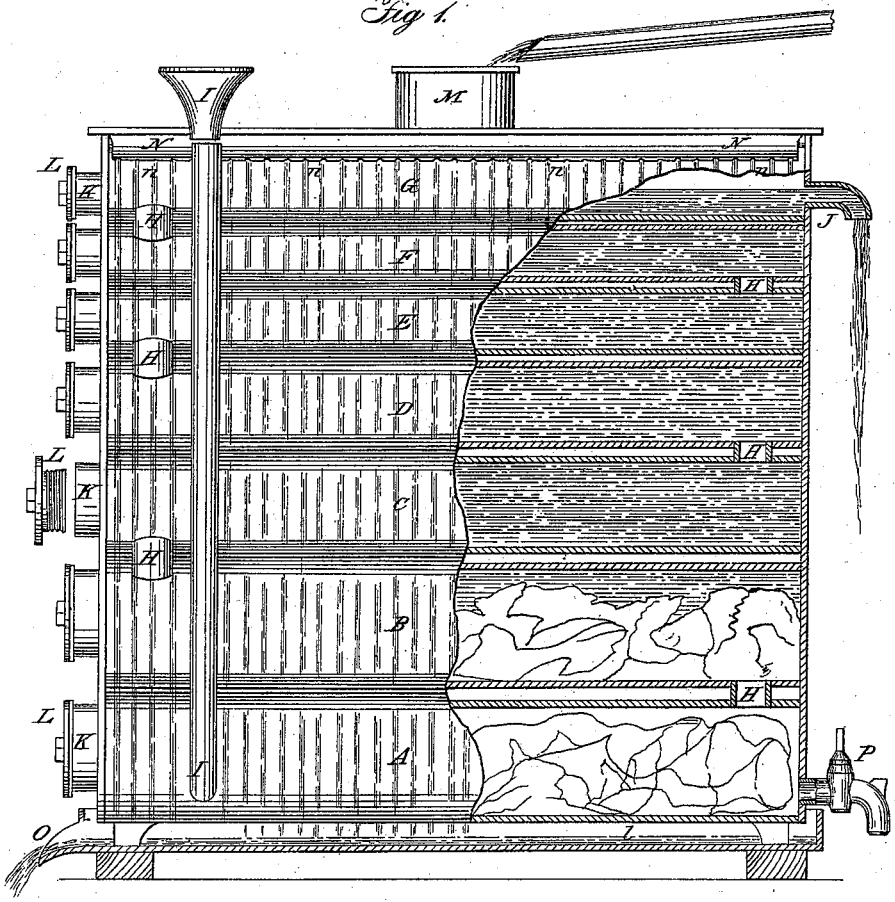
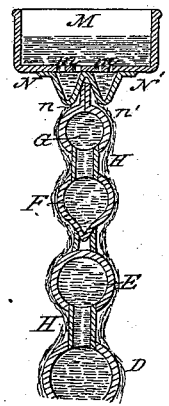
Witnesses:
Inventor:

United States Patent Office.

DAVID CAMMERER, OF CINCINNATI, OHIO.

Letters Patent No. 63,013, dated March 19, 1867.

IMPROVED BEER COOLER.

The Schedule referred to in these Letters Patent and making part of the same.

TO WHOM IT MAY CONCERN:

Be it known that I, DAVID CAMMERER, of Cincinnati, in the county of Hamilton, and State of Ohio, have invented a new and useful "Beer Cooler;" and I hereby declare the following to be a full, clear, and exact description of the same, reference being had to the accompanying drawings, making part of this specification.

My invention relates to a device for the rapid cooling of beer or wort on its way from the boiling kettle to the fermenting "vat" or "tun."

Figure 1 is a side elevation partially in section of a cooler embodying my invention.

Figure 2 is a transverse section of the upper portion thereof.

A, B, C, D, E, F, and G, are a series of horizontal tubes of unequal diameters, arranged vertically one above another in a stack, the largest being at bottom, and so on with lessening diameters upward.

The said tubes communicate with each other at alternate ends by short pipes or passages, H.

I is a water-supply pipe, which communicates with the lower part of the bottom tube and is extended upward to its receiving end, (somewhat higher than the top of the stack.)

A discharge spout, J, from the uppermost tube, permits the escape of warm water from the stack in corresponding quantity to the cold water admitted through the pipe I to the bottom thereof.

Each tube has a screw-threaded mouth, K, closed by a corresponding screw-threaded cap, L.

Surmounting the stack is a trough or funnel, M, to receive the hot liquor which escapes through orifices $m$ into two gutters, N N', which extend the whole length of the stack, and whose orifices $n n$ discharge respectively in equal streams distributed uniformly on to the opposite sides of the upper tube, whence said streams drip down on to the tube next below, and so from tube to tube entirely down the stack, finally discharging into a spout, O, which conducts the now cool wort to the fermenting tun.

$g$ represents a flange, projecting upward between the troughs N N' to more effectually separate the liquor flowing therefrom and equalize the flow down the respective sides of the stack.

One or two of the lower tubes are packed with ice in greater or less quantity according to the heat of the weather.

P is a cock for emptying the stack after each run.

The tubes I prefer to construct of copper tinned or galvanized with zinc on the outside.

Where the amount of wort to be cooled reaches to from seventy-five to one hundred barrels per hour, I provide from eighteen to twenty tubes, about twenty feet long, and ranging from ten inches diameter for the bottom tube to two inches for the top one.

I am aware that beer coolers have before been made with a vertical range of horizontal tubes through which water is caused to flow from bottom to top, and therefore do not claim such an invention broadly; but, My invention is superior to previous devices of like character in the following respects:

The flange $g$, and separate troughs N N', equalize very effectively the flow of liquor down the respective sides of the apparatus.

By making the lower tubes of much greater diameter than the upper one, I effectually prevent any part of the liquor escaping the cooling process when the flow is rapid and copious, but insure every drop coming in contact with the cooling surface of every successive tube.

The large size of the lower tubes adapts them to contain too large a body of water to be rapidly heated by the liquor under treatment and to receive ice, (as well as water,) by which their cooling effect is greatly increased.

What I claim, and desire to secure by Letters Patent, is—

The arrangement of the tubes A, B, C, D, &c., decreasing in size from the bottom upward, the separate troughs N N', and projecting flange $g$, substantially as and for the purposes set forth.

In testimony of which invention I hereunto set my hand.

DAVID CAMMERER.

Witnesses:
  GEO. H. KNIGHT,
  F. F. WISNEWSKI.